June 17, 1958  C. D. VISOS  2,839,661
COFFEE MAKER AND SWITCH THEREFOR
Filed July 27, 1954

Inventor
Charles D. Visos
by Bair, Freeman & Molinare
Attys.

United States Patent Office 2,839,661
Patented June 17, 1958

2,839,661
COFFEE MAKER AND SWITCH THEREFOR

Charles D. Visos, St. Louis, Mo., assignor to Knapp-Monarch Company, St. Louis, Mo., a corporation of Delaware Application July 27, 1954, Serial No. 446,135

11 Claims. (Cl. 219—44)

This invention relates to a switch for vacuum-type coffee makers and more particularly to a switch which provides for a plurality of operations in the coffee maker at a plurality of temperature levels.

In the construction of this invention, there is provided a switch which provides for operation of the coffee maker at three different temperature levels: one of said temperature levels being referred to as a brew temperature at which the coffee is brewed, and which is approximately the boiling point of water; a second temperature level being an instant or rewarm temperature at which cold coffee is either rewarmed or at which instant coffee is to be made, and which temperature is below the brew temperature; and a third temperature level being a keep-warm, or serve, temperature at which coffee is kept warm at a desirable drinking temperature, which temperature is below both the brew and instant temperatures.

Furthermore, in the construction of this invention, it is provided that after the brewing cycle of either the regular-type or instant-type coffee has been completed the switch is automatically operated to become positioned in a keep-warm switch position. As another desirable feature of this invention, a manual setting lever is provided for selectively positioning the switch for operating the coffee maker at any one of said plurality of temperatures, and said manual setting lever projects outwardly of the coffee maker and is responsive to the condition of the switch so as to provide means for visually indicating at which temperature level the switch is operating.

Thus, one object of this invention is to provide a novel three-position switch for a coffee maker which is operative for operating the coffee maker at any one of three temperature levels, brew, instant or rewarm, and keep-warm or serve, and which switch is also operative to automatically switch to the keep-warm temperature after completion of either the brew or instant heating cycles.

Another object of this invention is to provide an improved switch construction which achieves the above set forth purposes and which is particularly characterized by its simplicity and inexpensiveness of construction.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which.

Figure 1:
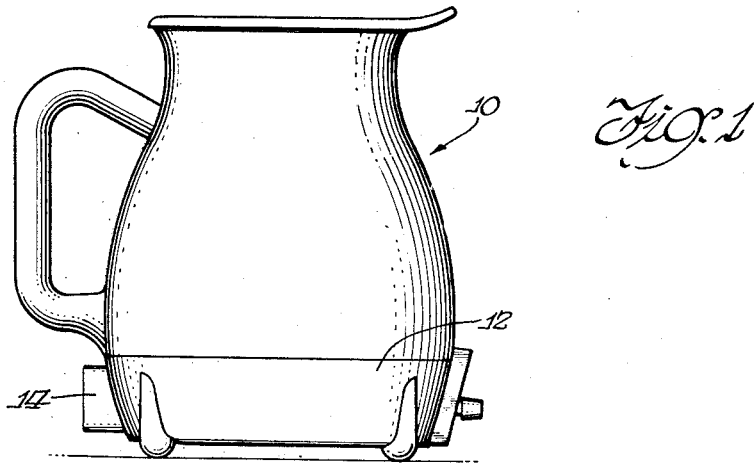
Figure 1 is a side elevation view of a lower bowl for a vacuum-type coffee maker provided with the present invention.

Referring now to the drawings, there is shown in Figure 1 the lower bowl 10 of a vacuum-type coffee maker. The bowl 10 is provided with an enclosing bottom skirt 12 which is formed of an insulating material, preferably a thermosetting plastic. The skirt 12 has a plug receiving socket formed thereon in which socket are positioned male prongs which serve as the terminal ends of the heating circuit for the lower bowl.

Figure 2:
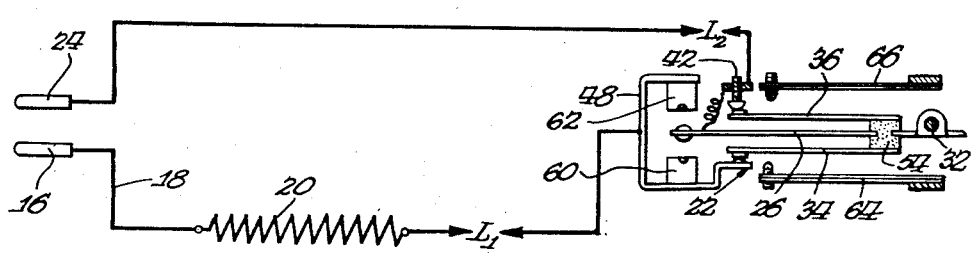
Figure 2 is a diagrammatic illustration of a circuit incorporating the switch of this invention.

Referring now to Figure 2, there is shown, diagrammatically, the heating circuit for the lower bowl 10 of the vacuum-type coffee maker. The circuit includes a male prong 16, line 18, heating element 20, line $L_1$, switch means 22, line $L_2$, and male prong 24. The prongs 16 and 24 are adapted to be positioned in the plug receiving socket 14 in the skirt of the lower bowl 10. The heating element 20 is of a well known construction and generally includes a U-shaped tube, of copper or the like, which is soldered onto the bottom of bowl 10 to insure good heating contact therewith. The heating element further includes an insulating liner in the copper tube, in which liner a Nichrome heating element is embedded. The detail of the heating element 20 is not shown in the drawings, as such elements do not constitute the novel portion of this invention.

Figure 3:
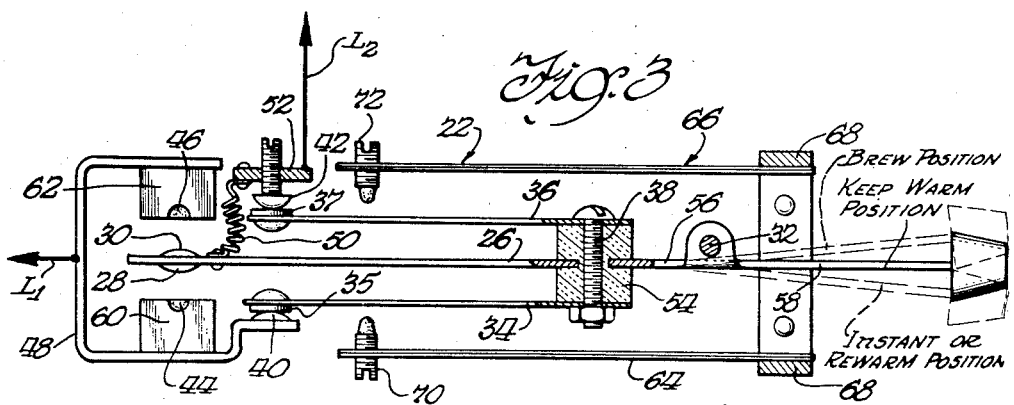
Figure 3 illustrates the details of the switch of this invention.

Referring now to the switch means 22 which are shown in detail in Figure 3, there is shown a contact carrying arm 26 having a pair of contacts 28 and 30 thereon. The contact arm is mounted for pivotal movement in opposite directions about the axis of pivot pin 32. The switch means 22 also includes a pair of spring blades 34 and 36 which are positioned on opposite sides of the contact carrying arm 26. The spring blades 34 and 36 are electrically connected to each other by means of a mounting bolt 38. The spring blades 34 and 36 carry contacts 35 and 37 respectively thereon.

The switch means 22 also includes a first pair of spaced contacts 40 and 42. This pair of spaced contacts 40 and 42 and the spring blades 34 and 36 are so positioned and constructed that the contacts 35 and 37 on the spring blades are normally in engagement with said first pair of spaced contacts. Thus, contact 35 is normally in engagement with contact 40, and contact 37 is normally in engagement with contact 42.

There is additionally provided a second pair of spaced contacts 44 and 46 which are positioned to be selectively engaged respectively by contacts 28 and 30 carried by the contact carrying arm 26. The contact carrying arm 26 and the spring blades 34 and 36 are operatively associated with each other so that the spring blades 34 and 36 operate to normally position the contact carrying arm 26 in the position shown in Figure 3, wherein the contact carrying arm is in spaced relation between the pair of spaced contacts 44 and 46.

The second pair of spaced contacts 44 and 46, and the contact 40 are all electrically connected to an electrically conductive bracket 48 which in turn is electrically connected to line $L_1$ on one side of the electrical circuit. The contacts 28 and 30 and the contact 42 are electrically connected to line $L_2$ on the other side of the electrical circuit. The contacts 28 and 30 are in conductive relation to the contact carrying arm 26 which is connected by line 50 to a bracket, or washer, 52 that is, in turn, in electrically conductive relation to the contact 42 by means of which said electrical connection of the contacts 28, 30 and 42 is effected to line $L_2$.

The pair of spring blades 34 and 36 are rigidly mounted on an insulating plug 54 by means including bolt 38, and said insulating plug 54 in addition carries the contact carrying arm 26, in insulated relation to the spring blades 34 and 46. The plug 54 is in turn carried on a lever 56 which is in insulating relation thereto. The lever 56 is pivotally mounted on pivot pin 32 and provides a manually operable portion 58 for selectively moving the contact carrying arm 26 to one of three selected positions. One of said three positions is shown in Figure 3, wherein the contact carrying arm 26 is in spaced relation between the contacts 44 and 46. A second of the three positions of the contact carrying arm 26 is where contact 28 engages contact 44, and the third position of the contact carrying arm 26 is the position wherein contacts 30 and 46 are in engagement.

Magnets 60 and 62 are provided adjacent the contacts 44 and 46 and said magnets cooperate with the contact carrying arm 26 which serves as a magnet keeper. When the contact carrying arm 26 is swung to the position wherein contacts 28 and 44 engage, such movement is against the bias of the spring blade 34 and accordingly a restoring force or bias is built up within the spring blade 34. The magnet 60 and arm 26 are so designed that the magnetic force between the magnet 60 and the contact carrying arm 26 is sufficient to overcome the restoring force, or bias, of the spring blade 34 against which the magnetic force is opposed. Similarly the magnetic force developed between magnet 62 and the contact carrying arm 26 is greater than the restoring force, or bias, developed in the spring blade 36 against which said magnetic force is opposed.

The switch means 22 additionally includes a pair of bimetal arms 64 and 66 which are disposed on opposite sides of the contact carrying arm 26 and outwardly of the spring blades 34 and 36. The bimetal arms 64 and 66 are carried by a heat conducting bracket 68 which is appropriately secured to the bottom of the coffee making bowl 10 so as to make the bimetal arms 64 and 66 responsive to the temperature of the bowl 10.

The bimetal arms 64 and 66 are adapted to move inwardly toward the contact carrying arm 26, with an increase in temperature, and said bimetal arms are adapted to engage the spring blades 34 and 36 and to urge said spring blades in directions away from the contact closing positions (shown in Figure 3) upon a rise in temperature in the bowl 10, and to permit closing of the contacts carried by the spring blades with a fall in temperature. Furthermore, each of the bimetal arms is not only operative to cause making and breaking of the circuits through the contacts 35 and 37 carried by the spring blades 34 and 36, but said bimetal arms are further cooperative through engagement with the spring blades and through engagement of the spring blade with the contact carrying arm 26 to overcome the magnetic force developed between the magnets 60 or 62 and the contact carrying arm 26 so as to move the contact carrying arm to a contact opening position.

When the arm 26 is in a contact opened position the magnetic force developed is reduced to a value below the restoring force of a spring blade, whereupon the restoring force of the spring blade takes over and is operative to swing the contact carrying arm 26 to the neutral position shown in Figure 3, wherein the resiliency of the spring blades 34 and 36 is operative to maintain the arm 26 in spaced relation between the magnets 60 and 62. The bimetal arms 64 and 66 respectively carry adjustment screws 70 and 72 which may be adjusted and calibrated to cause the operation of the switch at certain predetermined temperatures.

The effective thermal capacity of the conducting bracket 68 and the bimetal arms 64 and 66, and the heat conducting ability thereof, and the heat losses thereof, are so designed and selected that there is a temperature lag in the bimetal arms 64 and 66 relative to the temperature attained in the lower bowl 10. This is highly desirable because if the temperature in the bowl 10 has been rising steadily and then the heater is deenergized, the bimetal arms 64 and 66 will still continue to flex slightly as if under an increase in temperature, even though the heater has been deenergized. The additional flexing of the bimetal arms, caused by the temperature lag, even after the circuits for the heating element 20 has been broken, is effective to cause just sufficient further movement of the contact carrying arm 26 away from the magnet 60 or 62 so as to permit the restoring force of the spring blades 34 or 36 to take full command of the switch means, so as to restore the contact carrying arm 26 to the neutral position shown in Figure 3.

Referring now to the incorporation of the switch means hereinabove described in a coffee maker, there is a brew circuit condition, or setting, which occurs when the contacts 28 and 44 are in engagement with each other. A circuit is then established which includes line $L_1$, contact 44, contact 28, arm 26, line 50, washer 52, and line $L_2$. With the heating element 20 energized by the completion of the circuit between line $L_1$ and line $L_2$ through the switch means 22, the water in bowl 10 is heated until the greater portion of the water has been moved to the upper bowl of the vacuum-type coffee maker. After the greater portion of the water has been moved to the upper bowl of the coffee maker, the temperature in the bowl 10 begins to rise. The bimetal arm 64 is calibrated so that when this rise in temperature occurs after most of the water has left bowl 10, the bimetal arm 64 develops force sufficient to cause moving of the contact carrying arm 26 away from the magnet 60, whereupon the contacts 28 and 44 are separated thus breaking the circuit between lines $L_1$ and $L_2$.

Prior to the above breaking of the circuit between lines $L_1$ and $L_2$, the flexure of the bimetal arms 64 and 66 has been sufficient to flex the spring blades 34 and 36 away from their circuit closing positions. Thereafter, as the bowl 10 cools, the bimetal arms 64 and 66 flex back toward their original conditions, and contact is first established between contacts 35 and 40, and thereafter between contacts 37 and 42. However, no completed circuit between lines $L_1$ and $L_2$ is established until contacts 37 and 42 engage.

The bimetal arm 66 is so arranged and calibrated that the engagement of contacts 37 and 42 does not take place until the temperature in the bowl falls to a range of about 175° F. which is a desirable keep-warm temperature. Thus, it can be seen that by swinging the manually operated lever 56 to a position to effect engagement of the contacts 28 and 44, there is established a circuit, and a brewing cycle is begun which is used in the brewing of regular-type coffee, and, after the coffee has been brewed, the switch means moves automatically to a position at which the coffee in the lower bowl is kept at a keep-warm temperature. In the latter position, the keep-warm temperature position, the flexure of the bimetal arm 66 operating through spring blade 36 is operative to cycle the temperature of the heater 20 so as to keep the temperature of the coffee in the bowl 10 substantially at the keep-warm temperature.

The second cycle that can be operated by the switch thus disclosed requires swinging of the manually operable lever 56 to a position where the contacts 30 and 46 are in engagement. Once again, the circuit is completed between lines $L_1$ and $L_2$, this time through contacts 30 and 46, arm 26, line 50, and washer 52 to line $L_2$. The bimetal arm 66 is so constructed, arranged, and calibrated that sufficient force is developed by the bimetal 66 acting through the spring blade 36 against the contact carrying arm 26, to cause separation of contacts 30 and 46 upon the temperature in bowl 10 reaching the neighborhood of about 190° F. This temperature is a desirable temperature at which to rewarm cold coffee or to brew instant-type coffee.

After the temperature of the water in bowl 10 has reached the desired temperature, the flexure of bimetal arm 66 is sufficient to cause separation of contacts 30 and 46 whereupon the circuit between lines $L_1$ and $L_2$ is interrupted and the contact carrying arm 26 is restored to its normal position shown in Figure 3 in a manner similar to that described above. At the temperature of 190° F. at which the circuit between lines $L_1$ and $L_2$ has been interrupted, the flexure of the bimetal arms 64 and 66 has been sufficient to flex the spring blades 34 and 36 to open circuit positions. Thereafter as the temperature of the water in bowl 10 falls, there is first established contact between contacts 35 and 40 and thereafter between contacts 37 and 42. The establishing of engagement between contacts 37 and 42 is, as recited above, sufficient to complete a circuit between lines $L_1$ and $L_2$ and to again cause heating of heating element 20. Thereafter the bimetal arm 66 again operates as described hereinabove and is operatively associated with spring blade 36 so as to maintain the temperature in bowl 10 at approximately 175° F., and cycling of the heater on and off is effected, whereby the temperature in bowl 10 is maintained substantially at the keep-warm temperature.

It will be seen that for each of the three positions on contact carrying arm 26, the brew position, the instant position, and the keep-warm position, the lever means 56, which is rigidly connected to the contact carrying arm 26 by means of insulating plug 54, is movable to a different position. Accordingly, the position of the lever means 56, which lever means is adapted to extend outwardly of the lower bowl 10, affords visual means for indicating what portion of a brew cycle is being performed in the lower bowl 10.

While there has been shown and described a particular embodiment of this invention, it will be obvious to those skilled in the art that various changes and modifications may be made therein without departing from the invention and, therefor, it is intended in the appended claims to cover all such changes and modifications as fall within the true spirit and scope of the invention.

What I claim as new, and desire to secure by Letters Patent of the United States is:

1. In a coffee maker of the vacuum type having a lower bowl and an upper bowl, the improvement comprising: a heater for the lower bowl, and an energizing means for the heater including a single three-position switch for selectively setting a coffee brewing cycle either for regular-type coffee or for instant-type coffee, said switch including a movable contact arranged for movement to a first regular-type coffee brewing position and to a second instant-type coffee brewing position and to a third coffee-keep-warm position, and thermostatically controlled means operatively associated with said switch and movable contact for terminating heating after the coffee has been brewed with said contact in either said first or second position and for thereafter moving said contact to said third position and initiating heating for keeping the coffee warmed.

2. In a coffee maker of the vacuum type having a lower bowl and an upper bowl, the improvement comprising: a heater for the lower bowl, and an energizing means for the heater including a single three-position switch for selectively setting a coffee brewing cycle either for regular-type coffee or for instant-type coffee, said switch including a movable contact arranged for movement to a first regular-type coffee brewing position and to a second instant-type coffee brewing position and to a third coffee-keep-warm position, the cycle for each of said coffee brewing operations including the heating of the water in said bowl at coffee brewing temperatures and thereafter keeping the brew warmed, and thermostatically controlled means operatively associated with said switch and movable contact for terminating heating at said coffee brewing temperatures and for thereafter moving said contact to said third position and initiating thermostatic control for keeping the coffee warmed.

3. In a coffee maker of the vacuum type having a lower bowl and an upper bowl, the improvement comprising: in combination, a single heater element for the lower bowl; an energizing means for the heater element including a single three-position switch, in each of which positions the heater element may be energized; a control for selectively setting the three-position switch, in either a first position for brewing regular-type coffee or in a second position for brewing instant-type coffee; and thermostatic means operatively associated with said three-position switch for moving said switch from either said first or second coffee brewing positions, after coffee has been brewed, to a third position wherein the heater is cyclically energized through said switch to maintain the brewed coffee at a keep-warm temperature.

4. A switch for a coffee maker comprising a contact carrying arm adapted for movement in opposite directions, a pair of spring blades positioned on opposite sides of said contact carrying arm and being electrically connected to each other, each spring blade having a contact thereon, a first pair of spaced contacts, said pair of spaced contacts and spring blades being so positioned and constructed that the contact on each spring blade is normally in engagement with one of said first pair of spaced contacts, a second pair of spaced contacts positioned to be selectively engaged by contacts on said contact carrying arm, said contact carrying arm and spring blades being operatively associated with each other so as to normally position said contact carrying arm in spaced relation between said second pair of spaced contacts, means electrically connecting said second pair of spaced contacts and one of said first pair of spaced contacts to one side of an electrical circuit, means electrically connecting the contacts on said contact carrying arm and the second of said first pair of spaced contacts to the other side of an electrical circuit, a pair of bimetal arms each positioned to engage one of the spring blades and to urge said spring blade away from its contact closing position with increased temperature and to permit closing of said contacts with a fall in temperature, magnetic means operatively associated with said second pair of contacts and said contact carrying arm to produce sufficient magnetic force when said contact carrying arm is in a circuit closing position to overcome the bias of the one of said spring blades against which said magnetic force is opposed, and said bimetal arms each being operative through engagement with a spring blade and through engagement of said spring blade with said contact carrying arm to overcome said magnetic force and to move said contact carrying arm to a contact opening position, whereupon the resiliency of said spring blades operate to position said contact carrying arm in its normal position.

5. A switch for a coffee maker comprising a contact carrying arm adapted for movement in opposite directions, a pair of spring blades positioned on opposite sides of said contact carrying arm and being electrically connected to each other, each spring blade having a contact thereon, a first pair of spaced contacts, said pair of spaced contacts and spring blades being so positioned and constructed that the contact on each spring blade is normally in engagement with one of said first pair of spaced contacts, a second pair of spaced contacts positioned to be selectively engaged by contacts on said contact carrying arm, said contact carrying arm and spring blades being operatively associated with each other so as to normally position said contact carrying arm in spaced relation between said second pair of spaced contacts, means electrically connecting said second pair of spaced contacts and one of said first pair of spaced contacts to one side of an electrical circuit, means electrically connecting the contacts on said spaced contact carrying arm and the second of said first pair of contacts to the other side of an electrical circuit, a pair of bimetal arms each positioned to engage one of the spring blades and to urge said spring blade away from its contact closing position with increased temperature and to permit closing of said contacts with a fall in temperature, magnetic means operatively associated with said second pair of contacts and said contact carrying arm to produce sufficient magnetic force when said contact carrying arm is in a circuit closing position to overcome the bias of the one of said spring blades against which said magnetic force is opposed, and said bimetal arms each being operative through engagement with a spring blade and through engagement of said sprin blade with said contact carrying arm to overcome said magnetic force and to move said contact carrying arm to a contact opening position, whereupon the resiliency of said spring blades operate to position said contact carrying arm in its normal position, and lever means operatively associated with said contact carrying arm for selectively moving said contact carrying arm in opposite directions for establishing circuits which include said contact carrying arm.

6. A switch for a coffee maker comprising a contact carrying arm adapted for movement in opposite directions, a pair of spring blades positioned on opposite sides of said contact carrying arm and being electrically connected to each other, each spring blade having a contact thereon, a first pair of spaced contacts, said pair of spaced contacts and spring blades being so positioned and constructed that the contact on each spring blade is normally in engagement with one of said first pair of spaced contacts, a second pair of spaced contacts positioned to be selectively engaged by contacts on said contact carrying arm, said contact carrying arm and spring blades being operatively associated with each other so as to normally position said contact carrying arm in spaced relation between said second pair of spaced contacts, means electrically connecting said second pair of spaced contacts and one of said first pair of spaced contacts to one side of an electrical circuit, means electrically connecting the contacts on said contact carrying arm and the second of said first pair of spaced contacts to the other side of an electrical circuit, a pair of bimetal arms carried by support means which are adapted to transmit heat to said bimetal arms, said bimetal arms each being positioned to engage one of the spring blades and to urge said spring blade away from its contact closing position with increased temperature and to permit closing of said contacts with a fall in temperature, magnetic means operatively associated with said second pair of contacts and said contact carrying arm to produce sufficient magnetic force when said contact carrying arm is in a circuit closing position to overcome the bias of the one of said spring blades against which said magnetic force is opposed, and said bimetal arms each being operative through engagement of said spring blade with said contact carrying arm to overcome said magnetic force and to move said contact carrying arm to a contact opening position, whereupon the resiliency of said spring blades operate to position said contact carrying arm in its normal position, and the effective thermal capacity of said support means and of the bimetal arms being so related to their heat conducting ability and heat losses as to cause the bimetal arms to continue flexing after the circuit through said contact carrying arm has been broken.

7. A switch for a coffee maker comprising a contact carrying arm adapted for movement in opposite directions, a pair of spring blades positioned on opposite sides of said contact carrying arm and being electrically connected to each other, each spring blade having a contact thereon, a first pair of spaced contacts, said pair of spaced contacts and spring blades being so positioned and constructed that the contact on each spring blade is normally in engagement with one of said first pair of spaced contacts, a second pair of spaced contacts positioned to be selectively engaged by contacts on said contact carrying arm, said contact carrying arm and spring blades being operatively associated with each other so as to normally position said contact carrying arm in spaced relation between said second pair of spaced contacts, means electrically connecting said second pair of spaced contacts and one of said first pair of spaced contacts to one side of an electrical circuit, means electrically connecting the contacts on said spaced contact carrying arm and the second of said first pair of contacts to the other side of an electrical circuit, a pair of bimetal arms each positioned to engage one of the spring blades and to urge said spring blade away from its contact closing position with increased temperature and to permit closing of said contacts with a fall in temperature, magnetic means operatively associated with said second pair of contacts and said contact carrying arm to produce sufficient magnetic force when said contact carrying arm is in a circuit closing position to overcome the bias of the one of said spring blades against which said magnetic force is opposed, and said bimetal arms each being operative through engagement with a spring blade and through engagement of said spring blade with said contact carrying arm to overcome said magnetic force and to move said contact carrying arm to a contact opening position, whereupon the resiliency of said spring blades operate to position said contact carrying arm in its normal position, and said pair of bimetal arms being so constructed and arranged that each is operative to move its associated spring blade to a circuit breaking position at a different temperature.

8. A switch for a coffee maker comprising a contact carrying arm adapted for movement in opposite directions, a pair of electrically connected spring blades positioned on opposite sides of said contact carrying arm, each spring blade having a contact thereon, a first pair of spaced contacts, said pair of spaced contacts and spring blades being so positioned and constructed that the contact on each spring blade is normally in engagement with one of said first pair of spaced contacts, a second pair of spaced contacts positioned to be selectively engaged by contacts on said contact carrying arm, said contact carrying arm and spring blades being operatively associated with each other so as to normally position said contact carrying arm in spaced relation between said second pair of spaced contacts, means electrically connecting said second pair of spaced contacts and one of said first pair of spaced contacts to one side of an electrical circuit, means electrically connecting the contacts on said contact carrying arm and the second of said first pair of spaced contacts to the other side of an electrical circuit, a pair of bimetal arms each positioned to engage one of the spring blades and to urge said spring blade away from its contact closing position with increased temperature and to permit closing of said contacts with a fall in temperature, magnetic means operatively associated with said second pair of contacts and said contact carrying arm to produce sufficient magnetic force when said contact carrying arm is in a circuit closing position to overcome the bias of the one of said spring blades against which said magnetic force is opposed, said bimetal arms each being operative through engagement with a spring blade and through engagement of said spring blade with said contact carrying arm to overcome said magnetic force and to move said contact carrying arm to a contact opening position, whereupon the resiliency of said spring blades operate to position said contact carrying arm in its normal position, said pair of bimetal arms being so constructed and arranged that each is operative to move the contact carrying arm to a circuit breaking position at a different temperature, one of said temperatures being at a temperature for brewing regular-type coffee and the other being at a temperature for brewing instant-type coffee.

9. A switch for a coffee maker comprising a contact carrying arm adapted for movement in opposite directions, a pair of electrically connected spring blades positioned on opposite sides of said contact carrying arm, each spring blade having a contact thereon, a first pair of spaced contacts, said pair of spaced contacts and spring blades being so positioned and constructed that the contact on each spring blade is normally in engagement with one of said first pair of spaced contacts, a second pair of spaced contacts positioned to be selectively engaged by contacts on said contact carrying arm, said contact carrying arm and spring blades being operatively associated with each other so as to normally position said contact carrying arm in spaced relation between said second pair of spaced contacts, means electrically connecting said second pair of spaced contacts and one of said first pair of spaced contacts to one side of an electrical circuit, means electrically connecting the contacts on said contact carrying arm and the second of said first spaced pair of contacts to the other side of an electrical circuit, a pair of bimetal arms each positioned to engage one of the spring blades and to urge said spring blade away from its contact closing position with increased temperature and to permit closing of said contacts with a fall in temperature, magnetic means operatively associated with said second pair of contacts and said contact carrying arm to produce sufficient magnetic force when said contact carrying arm is in a circuit closing position to overcome the bias of the one of said spring blades against which said magnetic force is opposed, said bimetal arms each being operative through engagement with a spring blade and through engagement of said spring blade with said contact carrying arm to overcome said magnetic force and to move said contact carrying arm to a contact opening position, whereupon the resiliency of said spring blades operate to position said contact carrying arm in its normal position, lever means operatively associated with said contact carrying arm for selectively moving said contact carrying arm in opposite directions for establishing circuits which include said contact carrying arm, said lever means being pivotally mounted, and said contact carrying arm and said pair of spring blades being assembled as a unit and being pivotable with said lever means about the pivot axis of said lever means.

10. A switch for a coffee maker comprising a contact carrying arm adapted for movement in opposite directions, a pair of electrically connected spring blades positioned on opposite sides of said contact carrying arm, each spring blade having a contact thereon, a first pair of spaced contacts, said pair of spaced contacts and spring blades being so positioned and constructed that the contact on each spring blade is normally in engagement with one of said first pair of spaced contacts, a second pair of spaced contacts positioned to be selectively engaged by contacts on said contact carrying arm, said contact carrying arm and spring blades being operatively associated with each other so as to normally position said contact carrying arm in spaced relation between said second pair of spaced contacts, means electrically connecting said second pair of spaced contacts and one of said first pair of spaced contacts to one side of an electrical circuit, means electrically connecting the contacts on said contact carrying arm and the second of said first pair of spaced contacts to the other side of an electrical circuit, a pair of bimetal arms each positioned to engage one of the spring blades and to urge said spring blade away from its contact closing position with increased temperature and to permit closing of said contacts with a fall in temperature, magnetic means operatively associated with said second pair of contacts and said contact carrying arm to produce sufficient magnetic force when said contact carrying arm is in a circuit closing position to overcome the bias of the one of said spring blades against which said magnetic force is opposed, and said bimetal arms each being operative through engagement with a spring blade and through engagement of said spring blade with said contact carrying arm to overcome said magnetic force and to move said contact carrying arm to a contact opening position, whereupon the resiliency of said spring blades operate to position said contact carrying arm in its normal position, and said pair of bimetal arms being so constructed and arranged that each is operative to move the contact carrying arm to a circuit breaking position at a different temperature.

11. In a coffee maker of the vacuum type having a lower bowl and an upper bowl, the improvement comprising: a heater for the lower bowl; and an energizing means for the heater including a three-position switch for selectively setting a coffee brewing cycle either for regular-type coffee or for instant-type coffee, said switch comprising a contact carrying arm adapted for movement in opposite directions, a pair of spring blades positioned on opposite sides of said contact carrying arm and being electrically connected to each other, each spring blade having a contact thereon, a first pair of spaced contacts, said pair of spaced contacts and spring blades being so positioned and constructed that the contact on each spring blade is normally in engagement with one of said first pair of spaced contacts, a second pair of spaced contacts positioned to be selectively engaged by contacts on said contact carrying arm, said contact carrying arm and spring blades being operatively associated with each other so as to normally position said contact carrying arm in spaced relation between said second pair of spaced contacts, means electrically connecting said second pair of spaced contacts and one of said first pair of spaced contacts to one side of said heater, means electrically connecting the contacts on said contact carrying arm and the second of said first pair of spaced contacts to the other side of said heater, a pair of bimetal arms each positioned to engage one of the spring blades and to urge said spring blade away from its contact closing position with increased temperature and to permit closing of said contacts with a fall in temperature, magnetic means operatively associated with said second pair of contacts and said contact carrying arm to produce sufficient magnetic force when said contact carrying arm is in a circuit closing position to overcome the bias of the one of said spring blades against which said magnetic force is opposed, and said bimetal arms each being operative through engagement with one of said spring blades and through engagement of said spring blade with said contact carrying arm to overcome said magnetic force and to move said contact carrying arm to a contact opening position, whereupon the resiliency of said spring blades operates to position said contact carrying arm in its normal position.

References Cited in the file of this patent

UNITED STATES PATENTS

| | | |
|---|---|---|
| 2,262,286 | Ireland | Nov. 11, 1941 |
| 2,276,216 | Lehmann | Mar. 10, 1942 |
| 2,427,945 | Clark et al. | Sept. 23, 1947 |
| 2,458,640 | Reichold | Jan. 11, 1949 |
| 2,573,237 | Wilcox | Oct. 30, 1951 |
| 2,614,189 | Mosley | Oct. 14, 1952 |
| 2,651,707 | Jepson | Sept. 8, 1953 |
| 2,659,787 | Brickett | Nov. 17, 1953 |
| 2,667,566 | Huck et al. | Jan. 26, 1954 |
| 2,687,469 | Koci | Aug. 24, 1954 |
| 2,692,937 | Clark | Oct. 26, 1954 |
| 2,694,770 | Sullivan | Nov. 16, 1954 |
| 2,740,019 | Kueser | Mar. 27, 1956 |
| 2,741,682 | Schwaneke et al. | Apr. 10, 1956 |
| 2,753,437 | Mertler | July 3, 1956 |